United States Patent [19]

Collin et al.

[11] 4,203,345
[45] May 20, 1980

[54] AUTOMATIC VISUAL TEACHING DEVICE FOR THE LEARNING OF MUSIC OR COMPONENT PARTS THEREOF

[76] Inventors: Maurice Collin, 620 Rue Robichaud Charlesbourg; Michel Lapointe, 1672 Ave. Colmar Orsainville; André Collin, 1525 Leduc Bourg Royal, all of Quebec City, Quebec, Canada

[21] Appl. No.: 871,973

[22] Filed: Jan. 24, 1978

[30] Foreign Application Priority Data

Nov. 15, 1977 [CA] Canada .................................. 290883

[51] Int. Cl.$^2$ ............................................. G09B 15/02
[52] U.S. Cl. ..................................... 84/478; 84/485 R
[58] Field of Search .................. 84/470, 471, 478, 485

[56] References Cited

U.S. PATENT DOCUMENTS

| | | | |
|---|---|---|---|
| 2,779,920 | 1/1957 | Petroff | 84/470 |
| 3,004,461 | 10/1961 | Semoneit | 84/470 |
| 4,031,797 | 6/1977 | Schmoyer | 84/470 |
| 4,054,868 | 10/1977 | Rose | 84/470 R |

*Primary Examiner*—Michael L. Gellner
*Assistant Examiner*—S. D. Schreyer

*Attorney, Agent, or Firm*—Guy J. Houle; Alan Swabey; Robert Mitchell

[57] ABSTRACT

An automatic visual music teaching device for displaying the structure of coded chords. The device comprises a plurality of actuable switches for selecting a desired coded chord. Signals associated with the actuated switches are temporarily stored and are indicative of the desired coded chord to be visually displayed. A further switch is activated to transfer the stored signals indicative of the desired coded chord to a decoding circuit. The decoded circuit feeds a memory system to select in a matrix the composite parts of the desired coded chord in accordance with a coded data signal sent to it by the decoder whereby the composite parts of the desired coded chord are visually indicated on a visual display element. The method of visually teaching the component part structure of musical coded chords comprises simply the step of selecting switches having coded marking thereon representative of musical notes in major and minor tones and corresponding to a desired coded chord for transferring a corresponding signal to a temporary storage circuit. A transfer switch is then depressed to obtain the visual indication of the composite parts of the desired coded chord for learning purposes.

16 Claims, 11 Drawing Figures

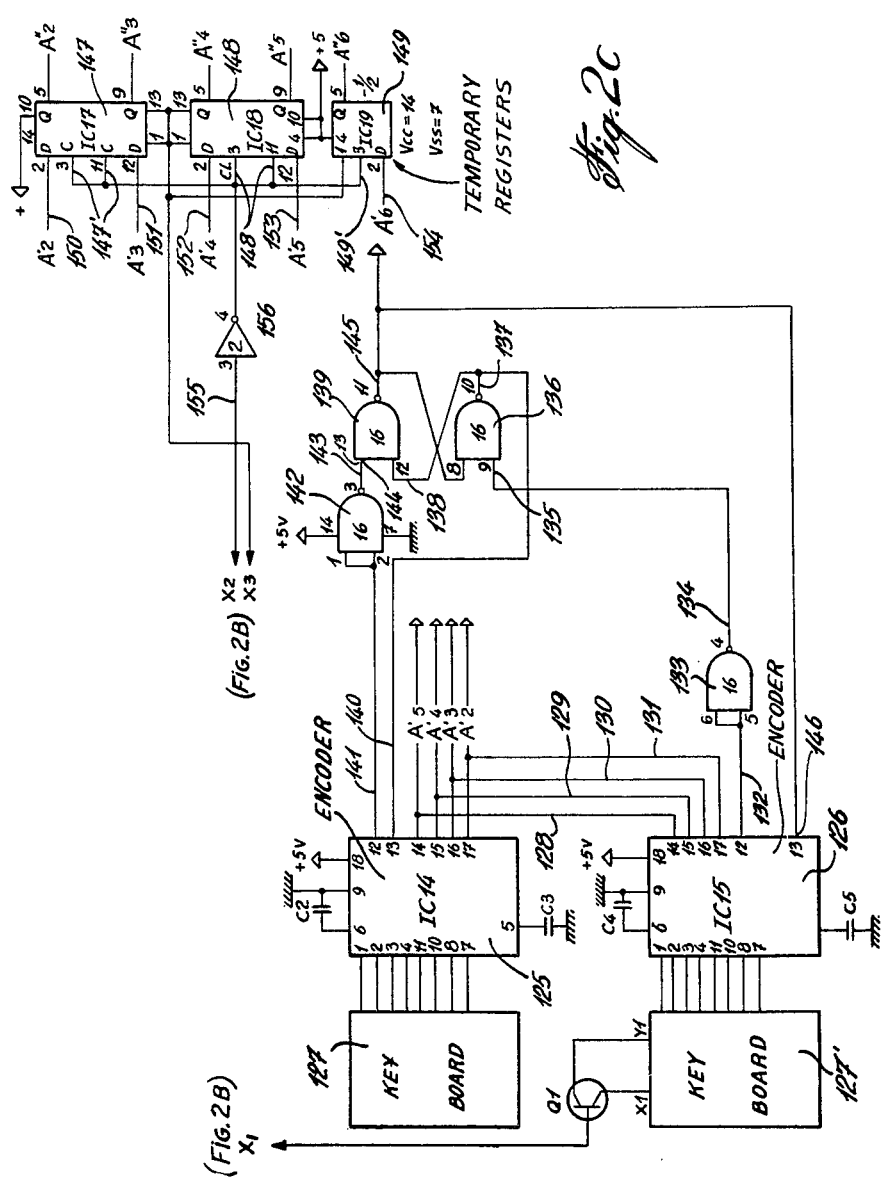

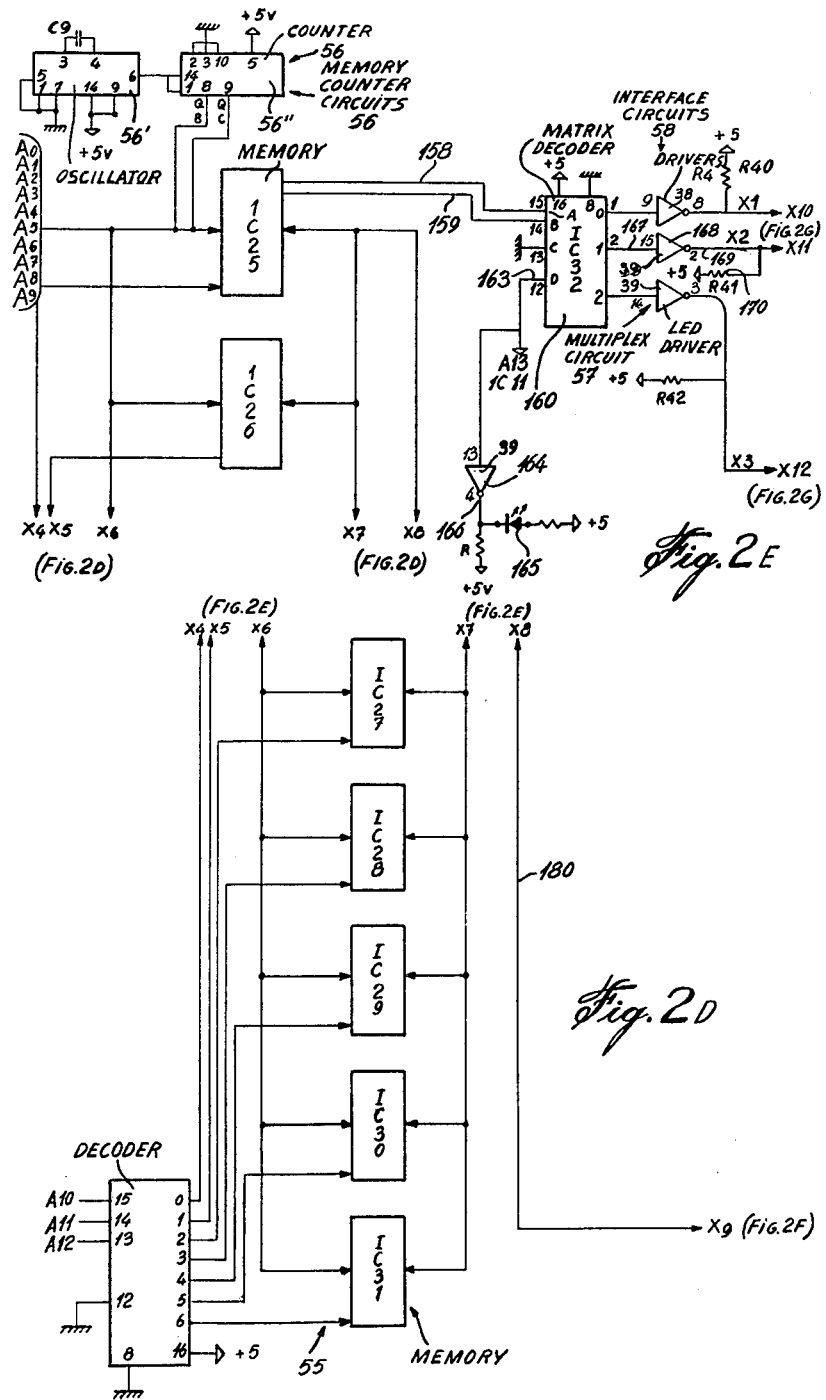

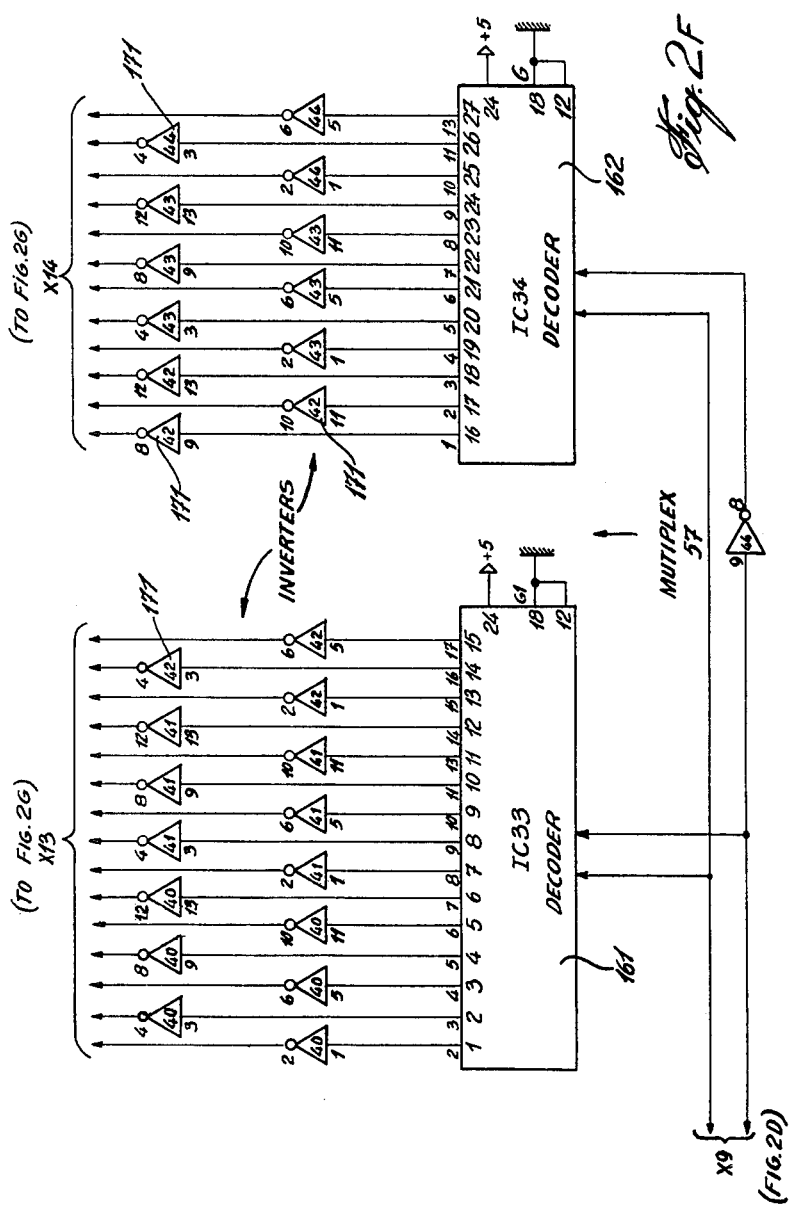

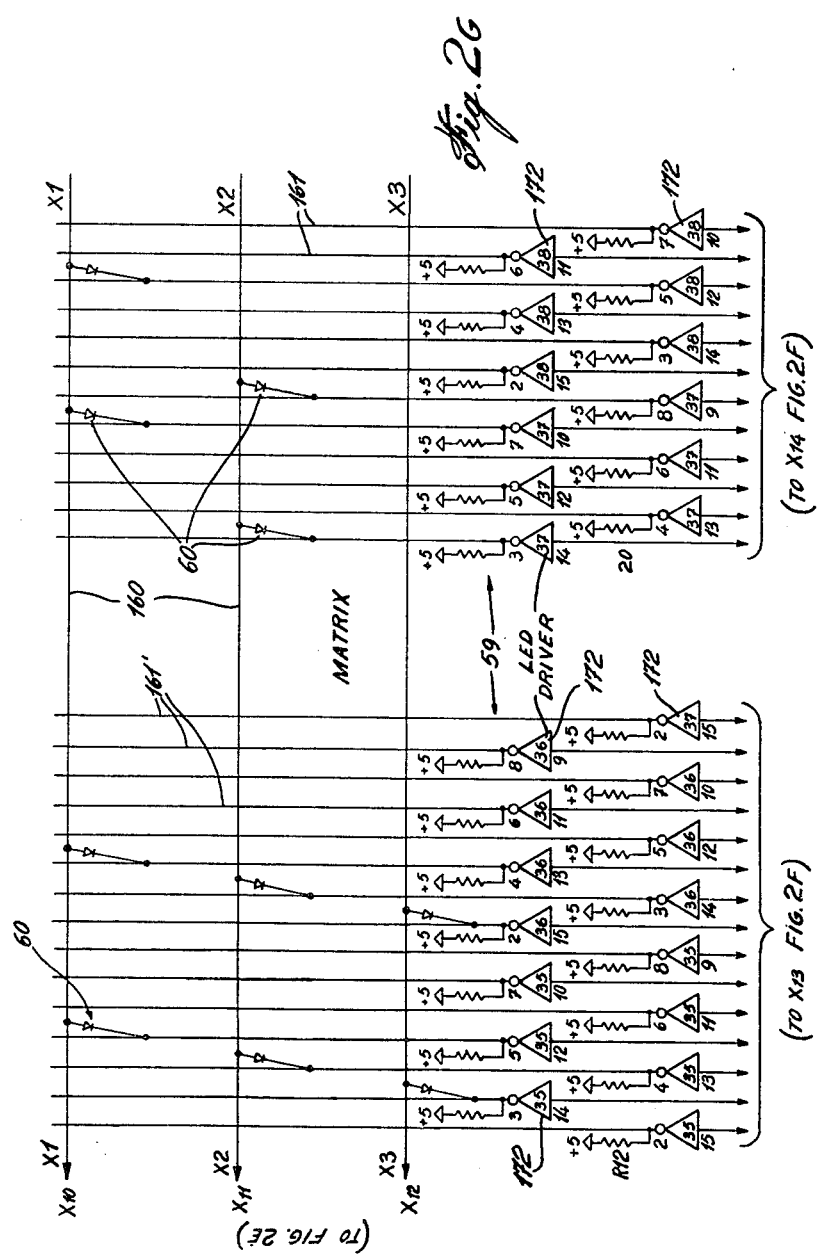

AUTOMATIC VISUAL TEACHING DEVICE FOR THE LEARNING OF MUSIC OR COMPONENT PARTS THEREOF

BACKGROUND OF INVENTION (a) Field of the Invention

The present invention relates to an improved device, method and system for automatically displaying the structure of coded musical chords for teaching purposes. A desired coded chord is demanded by depressing switches having coded markings corresponding to the desired coded chord and a further switch is activated to display the component parts of the selected desired coded chord.

(b) Description of Prior Art

Many types of chord teaching devices and methods are knoqn to help a person to play a musical instrument or to learn to read or write music. The majority of known devices are very large in size and expensive to procure. In some cases, the devices are incorporated into musical instruments such as pianos, organs, etc. Many of the known instruments are restricted to keyboards of the type as utilized on pianos, organs, or other like instruments and are very difficult to operate, therefore making it difficult for children to use.

Another disadvantage of known prior art instruments is that these have very limited capacities and do not provide a useful tool to professional musicians and teachers.

SUMMARY OF INVENTION

It is a feature of the present invention to provide a device and system to simplify the teaching and learning of the principal basic coded chords used in musical structures, and particularly the coded chord system used for all types of music. The system of this invention also develops in the student a greater interest in the study of music. This new approach permits the student, regardless of his knowledge of music, to learn the basic coded chords on all instruments that have a keyboard. It may also be used as an ultra-rapid memory aid to the pupil or professor as well as the amateur or professional musician.

It is another feature of the present invention to provide an automatic visual music teaching device which is fully automatic and which has a memory of infinite capacity whereby to provide visual display of a large number of musical chords or musical notes on a staff or any other visual output that may be associated with coded musical chords.

Another feature of the present invention is to provide an automatic visual music teaching device which is compact, and substantially economical to purchase whereby students of all ages will be able to utilize same.

A further feature of the present invention is to provide an automatic visual teaching device which will provide a student or teacher with a display of musical chords in the major and minor tones, flat and sharp levels, a plurality of tensions and a plurality of positions of the chords, all of which can be actuated automatically by pushbotton switches.

Another feature of the present invention is to provide an automatic visual music teaching device incapable of displaying musical chord structures which are not accurate.

A further feature of the present invention is to provide an improved method of visually teaching the component part structure of musical coded chords by simple operations.

According to the above features, from a broad aspect, the present invention provides an automatic visual music teaching device for displaying the structure of coded musical chords or scales. The device comprises a plurality of actuable switch means for selecting a desired coded chord or scale. Means is further provided for temporarily storing signals indicative of the desired coded chord or scale. A decoding circuit decodes the signals and provides a coded message signal. Display means is responsive to the coded message signal to visually indicate the composite parts of the desired coded chord or scale.

According to a broad aspect of the present invention, there is provided a method of visually teaching the component part structure of musical coded chords or scales. The method comprises the steps of selecting switches having coded markings thereon representative of musical notes in one or more modes and corresponding to a desired coded chord or scale for transferring a corresponding signal to a temporary storage means. A visual indication of the composite parts of the desired coded chord or scale is then obtained.

BRIEF DESCRIPTION OF DRAWINGS

A preferred embodiment of the present invention will now be described with reference to the accompanying drawings in which:

FIGS. 2A–2G are schematic diagrams of the circuitry of the music teaching system of the invention;

DESCRIPTION OF PREFERRED EMBODIMENTS

Figure 1:
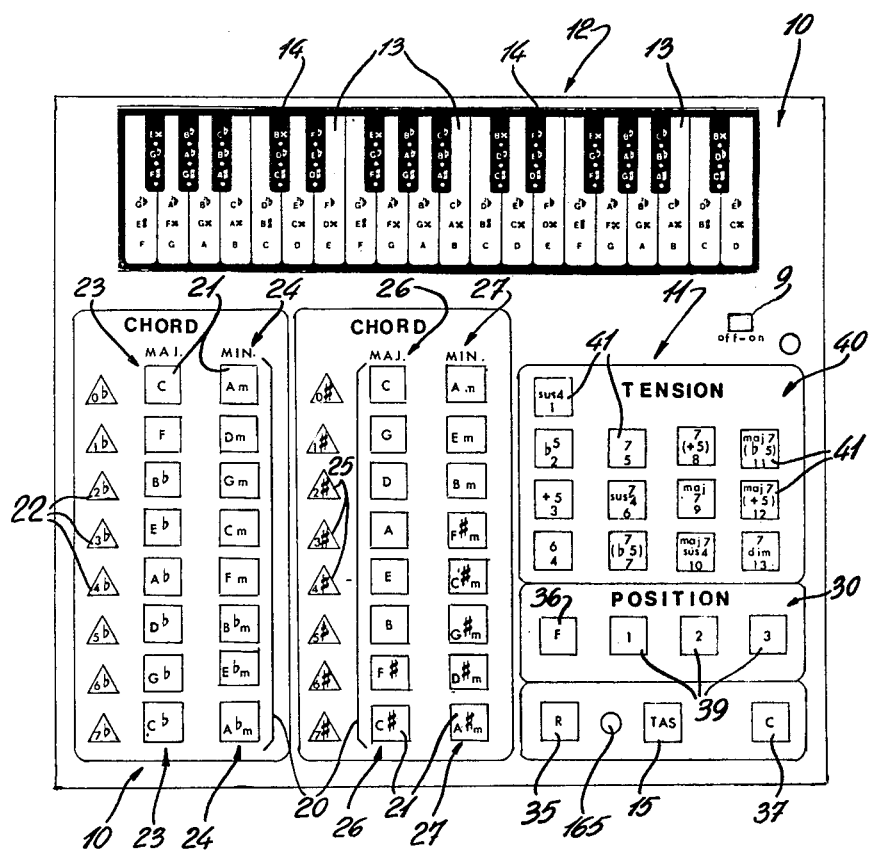
FIG. 1 is a plan view of an example of a console of the music teaching device using the system of the present invention.

Referring now to the drawings, and more particularly to FIG. 1, there is shown a preferred example of a layout for a console 10 constituting the music teaching device constructed in accordance with the present invention. As hereinshown, the console 10 comprises a keyboard section 11 in a main part thereof and divided into a first group of switches or keys 20 comprising a plurality of pushbutton switches 21 having coded markings thereon representing component parts of coded musical chords. Rows 23 and 26 of keys 21 represent major chords while rows 24 and 27 of keys 21 represent minor chords. The identifying markings 22 indicate the flatness while the markings 25 indicate the sharpness of the chord.

A second group 40 of switches or keys 41 is provided and these tension keys 41 select the proper tension of the chord which is desired to be displayed in accordance with a given coded chord selected by the user. The third group of switches or keys 30 is comprised by a first switch or key 36 representing the fundamental of any selected chord and switches or keys 39 represent three different inversions of any selected chord. Switch or key 35 is a "RESULT" switch which is activated after a desired coded chord has been selected by depressing particular ones of the keys in groups 20, 40 or 30, whereby to cause a visual display on a miniature music keyboard display 12 of various notes 13 or 14 representative of the component parts of the selected coded chord. The indicator light 165 indicates that the various switch keys of groups 20, 40 or 30 depressed by the user represent a false chord and that it is required to depress once more the proper switch keys of the desired coded chord to be displayed. Once the indicator light 165 is on, it is necessary to clear the electronic system of the device by depressing the CLEAR "C" switch key 37.

The switch key marked "TAS" and namely, switch key 15, is an automatic tension switch which causes the desired code to be displayed on the keyboard 12 at each of the tensions of switch group 40 and in an automatic sequence. This will be described in detail later. The fundamental "F" switch key 36 on the third group of switches 30 will cause a reset to the fundamental when depressed, should the circuit be in an inversion position other than the fundamental.

The music keyboard 12 is a representation of the chromatic and diatonic notes and is also provided with visual coded markings corresponding to the coded markings on particular ones of the switch keys representing the chords. A light emitting diode is associated with each of the markings on the notes 13 and 14 and these will light to visually indicate the corresponding notes on the music keyboard 12 for the particular coded chord depressed on the pushbutton switches of groups 20, 40 and 30.

It can be seen that a student can learn the various musical chords without the need of an instrument as the particular codes will be visually displayed on the miniature music keyboard 12. However, when the device is utilized with a musical instrument, such as a piano for this particular console, the notes 13 and 14 that are identified on the miniature music keyboard indicate to the student the position of his fingers on the keyboard. This visual indication will remain on the miniature keyboard 12 until the CLEAR "C" switch key 37 is depressed. Also, it can be seen that with this device and a proper teaching manual to indicate the use of the device, that the student can teach himself music and more quickly memorize chords even without practice on a musical instrument.

Figure 2A:
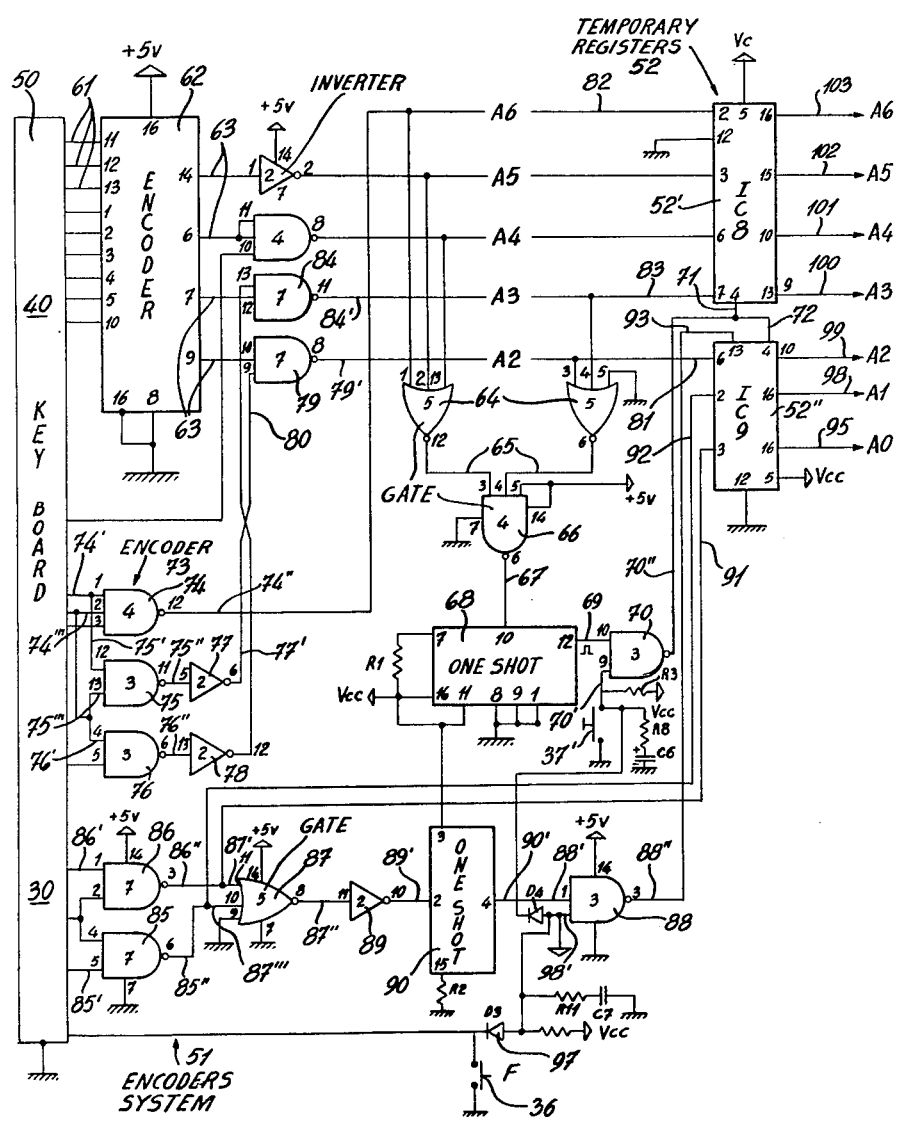
Figure 2B:
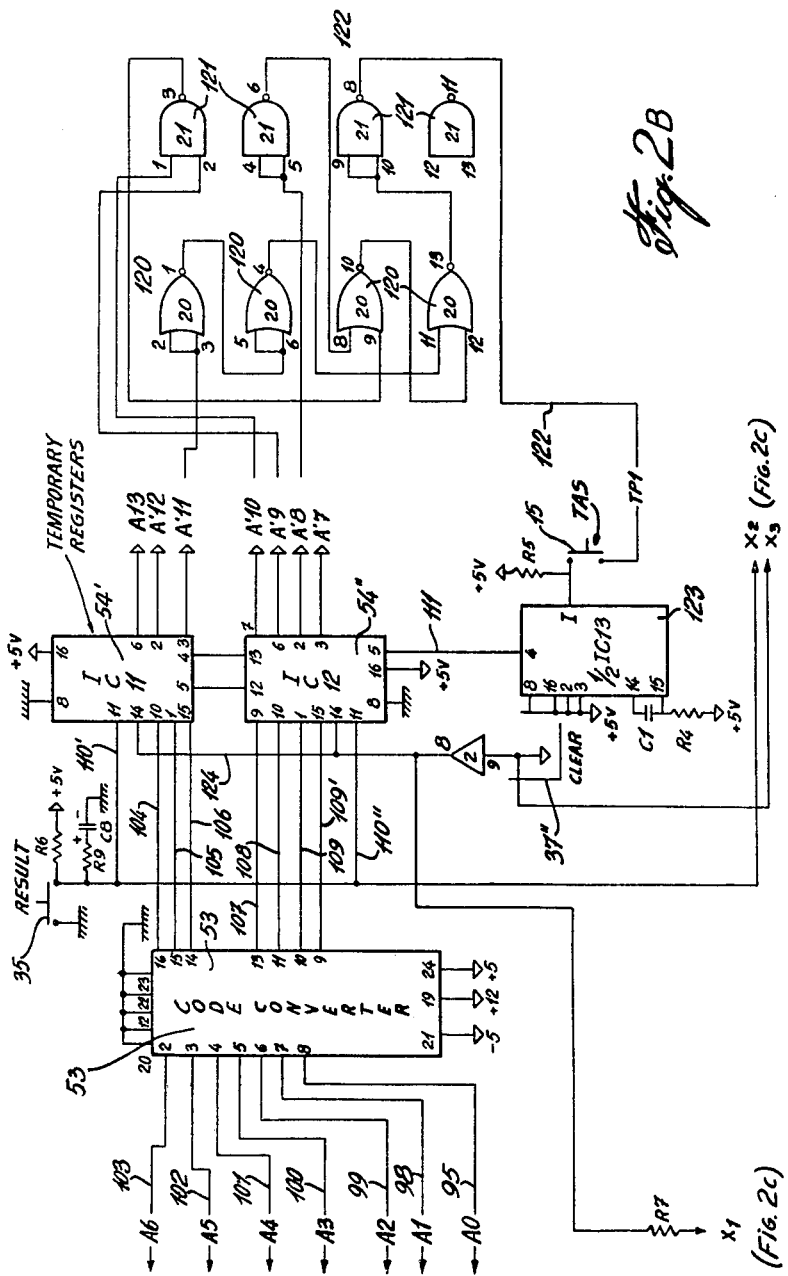

Referring now to FIGS. 2A–2G, there is shown the electronic system of the teaching device of this invention. Referring to FIG. 2A there is shown a keyboard input circuit 50 having pushbutton touch switches or keys of groups 30 and 40 as shown in FIG. 1. The output 61 of the keyboard circuit 50 connects to a system of keyboard encoders 51 which connect to a system of temporary registers 52. The registers 52 connect to a code converter circuit 53 (see FIG. 2B). The circuits 54 are latch counter circuits and a memory system is shown at 55 (see FIGS. 2D, 2E). The circuits at 56 (FIG. 2E) represent a counter memory. The circuits 57 (FIG. 2F) are multiplex circuit sections. Interface circuits 58 connect to the LED drivers 59 in a display or matrix X-Y consisting of illuminating diodes 60 (see FIGS. 2E, 2G).

Referring now to FIG. 2A, the keyboard circuit 50 consists of the connections for the many tension and position switch keys of groups 30 and 40, as shown in FIG. 1, which will give a signal on one of its outputs 61, depending on the key or keys depressed in the keyboard section 11. The information in encoder circuit 62 of encoder section 51, is on four output lines 63 and in coded form. This is connected to the circuits 52 which are temporary registers. At the same time, gates 64, which are connected to five input lines $A_2$–$A_6$, are at logic "1", and will produce a "0" output level at one of its outputs 65 if one of its five input lines is at a logic "1". A "0" logic level will thus appear on one of the two inputs 65 of gate 66. A "0" at the entrance of gate 66 will result in a "1" at the output 67 of gate 66. Thus, a "1" will appear on the input of integrated circuit 68.

Integrated circuit 68 is a one-shot circuit which gives a pulse at its output 69 of a few microseconds, which pulse will be connected to gate 70. This impulse will be connected to connector terminal 71 of temporary register 52′ and terminal 72 of temporary register 52″. This is a positive pulse which will permit the transfer, on the output of circuits 52′ and 52″, of the information present on the input lines.

The gate circuit 73, consisting of gates 74, 75 and 76 and inverters 77 and 78, serves four different codes for four different commutators. These encoders are also fed by tension switch keys in the second group of switches 40. The same codes are transferred on the address lines going to circuits 52′ and 52″. When input 74′ of gate 74 and input 75′ of gate 75 receives information of logic "0", a "1" will appear on the output 74″, and a "1" on the output 75″ of gate 75. A "1" on the input 76″ of gate 76 will produce a "0" at its output 76″ and a "1" at the output of inverter 78. The output 77′ of inverter 77 will be at logic "0". This logic "0" level will be connected to input 80 of gate 79 and the logic "0" will be transposed to a logic "1" at its output 79′ and this will be connected to input 81 of circuit 52″. At the same time, the output 74″ of gate 74 is at a positive level, 1″, thus, a "1" will be added to input 82 of the temporary register 52′. Also, at the same time, gate 64 will detect a "1" on one or the other of the lines (inputs 81 or 82), if a "1" is detected, a "0" will be at their outputs or the inputs 65 of gate 66 that will permit it to give a signal to the one-shot circuit 68. This signal will appear on the output 69 and be connected to the input of gate 70 and consequently at the output 70″. This impulse will also permit circuit 52″ to latch the information present at its input. If the input terminal 74‴ of gate 74 is at a logic "0" at the same time, the inputs 75‴ and 76′ of gates 75 and 76 will be at a "0" logic level. Thus, a "1" will be present at their respective outputs 74″, 75″ and 76″. The outputs 75″ and 76″ of gates 75 and 76 are connected to inverts 77 and 78 and their respective outputs will be at a logic "0". The outputs 79′ and 84′ of gates 79 and 84 will be at logic "1". This logic "1" is connected to input 83 of register 52′ and input 81 of register 52′. This is the signal for the register 52′ to transfer its logic information to its outputs.

Another encoder consisting of gates 85 to 88, inverter 89 and one-shot circuit 90 serves to convert for the group 30 of position keys, four codes which are different on two lines. These same codes are transferred to register 52′. If the input 86′ of gate 86 is at a logic "0", we will find a logic "1" at its output 86″ and at the same time, the same logic "1" will be on input 91 of register 52″. The logic "1" will be present at input 81′ of gate 87, resulting in a logic "0" at its output 87″. The inverter 89 will produce an inverted logic level "1" at its output 89′. The one-shot circuit 90, which is half of integrator 68, will give at its output terminal 90′ a pulse of a few microseconds which will be connected to gate 88 at its input 88′. A positive signal will appear at its output 88″ which will permit the transfer only of the first two input lines of register 52".

If the input 85' of gate 85 is at a logic "0", for example, a positive logic "1" will be present at its output 85" and connected at the same time to input 92 of register 52". At that same time, gate 87 will have the same signal level "1" on input 87'" and this signal will be transferred to the output 87" to a logic "0". This logic "0" will be inverted through the inverter 89 and its output 89' which is the signal to the input of the one-shot circuit 90. A signal of a few microseconds will be reproduced on output 90' and coupled to gate 88 and transferred at its output 88" to connect to input 93 of register 52' which will permit the transfer of the information at its output terminals 94 and 95.

The gate 70 has a reset connection 70' which serves as a reset to logic level "0", if the commutator reset switch 37' is depressed. A negative signal on line 69 will be transferred to a positive signal on the output 70" of that circuit and this information is connected to inputs 71 and 72 of registers 52" and 52'. This information permits to reset to "0" the registers as no information was composed at the moment when the reset to "0" was made. Switch 37', and 37" indicate the connections of the CLEAR "C" switch 37, as shown in FIG. 1.

The diode 97 permits a partial reset to "0" when the cathode of diode 97 is grounded by position fundamental "F" switch 36 (see FIG. 1). The terminal 98' of gate 88 has a negative impulse or level and thus at its output 88" we find a positive pulse which permits to reset to "0" the information present at the output of register 52" on output lines 95 and 98. The seven output lines 98 to 103 are connected directly to a code converter memory circuit 53 (see FIG. 2B) and which converts instantaneously these same codes into coded signals depending on the program. The coded signals are connected to the counters 54' and 54" on inputs 104; 105 and 106 of counter 54' and inputs 107, 108, 109 and 109' of counter 54". The information present at these inputs is transferred to their outputs only when inputs 110' and 110" of each of the two counters is at a logic level "0". This permits the transfer of the information present at the inputs of these circuits.

Output 111 of one-shot circuit 123 serves to advance the counters 54' and 54" from the starting point, placed by circuit 53, to make it advance to a certain point which would serve as a limit and which was predeterminately fixed by the circuit that were codified by gates 120 and 121. When the maximum count has been obtained, the output 122 of gate 121 becomes a positive level and it prevents the integrated circuit 123 to give impulses to the counters 54' and 54". Thus, the counters 54' and 54" can no longer advance to their maximum count and must be reset at "0" when the input 124 of the two counters is placed at a logic level "1".

Referring now more particularly to FIG. 2C, there is provided encoders 125 and 126 of the x-y sweeping type and by depressing one of the chord KEYS in the first group 20 of sixteen switch keys 21, in keyboard 127' for major chords and keyboard 127" for minor chords, the corresponding code will come out on outputs 128, 129, 130 and 131. Output 132 of encoder 126 will have a logic "0" which is inverted by gate 133 to have a "1" logic level at its output 134. This logic level "1" is coupled to input 135 of gate 136 which will invert and automatically we will find a logic "0" at the output 137 which will be coupled to input 138 of gate 139 and on terminal 140 of encoder 125. Encoder 125 will then be set in a tri-state position. Instantaneously, terminal 141 of encoder 125 will be at a logic level "0" and this logic level "0" will be inverted by gate 142 and its output 143 will become a logic "1" or the input 144 of gate 139 will be at logic "1".

Heretofore, we said that input 138 has a logic level "1" thereon. Therefore, at the output 145 of gate 139 we will find a logic level "0". This logic level "0" is coupled on pin A'6 and at the same time is coupled to the terminal 146 of encoder 126 which puts in the valid data. Encoder 126 will reset to "0" and automatically encoder 125 will do the same. The outputs 128, 129, 130, 131 and 146 are transferred on temporary memories constructed of memory circuits 147, 148 and half of memory circuit 149. When the information is present at the inputs 150 and 151 of memory circuit 147, inputs 152 and 153 of memory circuit 148 and input 154 of circuit 149, depressing the "RESULT" switch 35 (see FIG. 1) will place a logic level "0" on the input of inverter 156 and will transfer the information present at the inputs of the register circuits to the outputs A"2, A"3, A"4, A"5 and A"6. The circuit 149 is only half employed and thus the output A"6 is the only one used. Also, switch 35 will cause the counters 54' and 54" to transfer their information on their output lines.

The outputs of circuits 54', 54", 147, 148 and 149 constitute an address line consisting of a code of 12 bits. The three last bits of the code serve to locate in what section of the memory 55 (see FIG. 2D) the context is placed. The decoder circuit 157 (see FIGS. 2D and 2E) serves to decode this localization and activate the proper memory circuits 55, accordingly. The other bits of the address code will serve to localize in what section of the memory 55 we have to address ourselves. An oscillator 56' of medium frequency connects to a counter 56" which serves to divide the frequency and to sweep the first four bits of the memory. The memory 55 consists of integrated circuits of tri-state types and of high density.

The outputs of the memory 55 comprise 8 lines. The first two lines 158 and 159 serve to address the "X" lines of the matrix x, y 59. The first two bits serve to address the lines "X" 160 and the other lines will serve to address the "Y" 161. The matrix decoder circuit 160 serves to decoce which one of the "X" lines it must address itself depending on the code transferred to it by the memory 55. The output of the memories will furnish the two address lines as we have said to decode which "X" line must be addressed.

The other address lines 180 are directed towards decoder circuits 161 and 162 (see FIG. 2F) to address themselves depending on the codification established on the "Y" line we must place the information. We always have four codes that are different which are decoded by circuits 160, 161 and 162. The terminal 163 of circuit 160 is connected to lines A-13' of counter 54' and also to a circuit 164 and LED diode 165.

The diode 165 serves as a reference when the composed code has no value. Therefore, when the information is positive on this line, no information can be given on the display and automatically, if the line becomes positive, the input terminal of the circuit 164 is positive. Thus, the output 166 becomes negative and permits the diode 165, at its output, to light which serves as a reference to indicate that the code is illegal. When, for a given code at the input line 158 of counter 160, a "1" is present and input line 159 is at a "0", we will find at the output 167 a logic level "0". This logic level "0" will be connected to the input of an LED driver 168 which will reproduce at its output 169 a logic level "1". The impedance 170 permits line X2 to be at a positive potential. At the same time, if one of the lines going to decoders 161 or 162 is at a level logic "1", the decoders will decode which ones of the lines it must address itself to.

The output of the decoders will be at a logic level "0" and thus one of the "Y" lines 161' will have a logic level "0". However, there is provided inverters 171 in series with the "Y" lines 161 to connect the signal to the LED driver 172 which will have a logic "0" at its output, thus permitting line "Y" to have level logic "0" whilst line "X" 160' is at a positive potential or level "1". Between these two lines, there is provided an LED diode 60 which will light.

The matrix can be constituted of four by sixty LED's, or more, that is, 240 lights or more can be provided depending on the requirement of the system. Each light is swept at a regular interval depending on the frequency of the oscillator 56'. All of the codes are decoded automatically by decoders 160, 161 and 162. The memory can have substantially an infinite expansion and can receive as much information as is needed for the system and depending on the application of the system. The sweeping multiplex circuit consists of standard circuits connected either to sweep in either direction, that is, we can sweep sections x and y, and this can be done very rapidly.

The operation of the device of FIG. 1 will now be described. Firstly, the A.C. power outlet chord (not shown) is connected. The switch 9 is then placed to its "ON" position. The notes on the keyboard display 12 light up depending on the chord you have chosen under the sections entitled "CHORD", to indicate the component parts of the chord selected. Depressing one of these keys or switches 21 and the depressing of the Result switch 35 causes the component part of the perfect major chord chosen to be displayed on the keyboard by the light emitting diodes 60.

Ex.:
1—Press the "C" key 21.
2—Press the "R" key 35.
Result C E G (C) is displayed on the keyboard 12.

To obtain a display of the component parts of the perfect minor chord chosen, the following sequence is effected.

Ex.:
1—Press the "AM" key 21.
2—Press the "R" key 35.
Result A C E (Am) is displayed on the keyboard 12.

Depressing of one of the keys 21 in the group under the title "CHORD" and of one of the keys 41 in the group under the title "TENSION" and then the depressing of the Result key 35 shows on the display, with the aid of the LED's 60 the component parts of the thus selected chord.

Ex.:
1—Press the "F" key 21.
2—Press the "7" key 41.
3—Press the "R" key 35.
Result F A C Eb(F$^7$) is displayed on the keyboard 12.

Depressing of one of the keys 39 marked 1 2 3 on the inversion group 30, shows on the display, the 1st, 2nd or 3rd inversions of the selected chord. The "F" (Fundamental) key 36 retraces the fundamental position.

Ex.:
To obtain a display of the third chord inversion of: B$^b$ Maj 7 (+5)

1—Press on the "B$^b$" key 21.
2—Press on the "Maj" key 41. 7 (+5)
3—Press on the "3" key (position) 39.
4—Press on the "R" key 35.
Result A B$^b$ D F$^\#$ is displayed on the keyboard 12.

The red light emitting diode 165 placed between the "R" key 35 and the "ATS" key 15 lights up as a warning upon the selection of a third chord inversion of a chord that has three sounds, because a three sound chord possesses but two inversions. This indicates that the requested information is not proper and to verify the information requested.

To operate the automatic tension system key 15 one must first select one of the keys 21 under the title "CHORD" press on the "R" key 35 and finally on the "ATS" key 15.

OPERATION

Ex.:
C (Chord)
1—Press on the (C) key 21.
2—Press on the (R) key 35.
Result C E G=C (Chord) displayed on keyboard 12.
3—Press on the "ATS" key 15. (at this stage the "ATS" is functioning.
Result C F G (SUS. 4) Chord is displayed.
4—Press on the "ATS" key 15
Result C E G$^b$=(−5) chord is displayed.
5—Press on the "ATS" key 15.
Result C E G$^\#$=C (+5) C Chord is displayed, and so forth up to the thirteenth tension (7DIM).

One must press 13 times on "ATS" key 15 (once for each tension in order to go from SUS. 4 to (7DIM).

Figure 3:
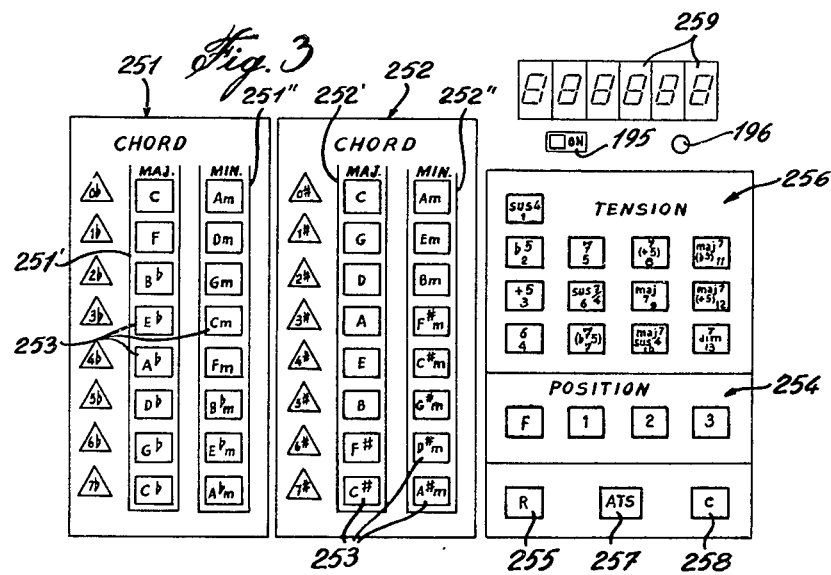
FIGS. 3, 3A is a plan view of another example of a console for music teaching utilizing the system of the present invention.
Figure 3A:
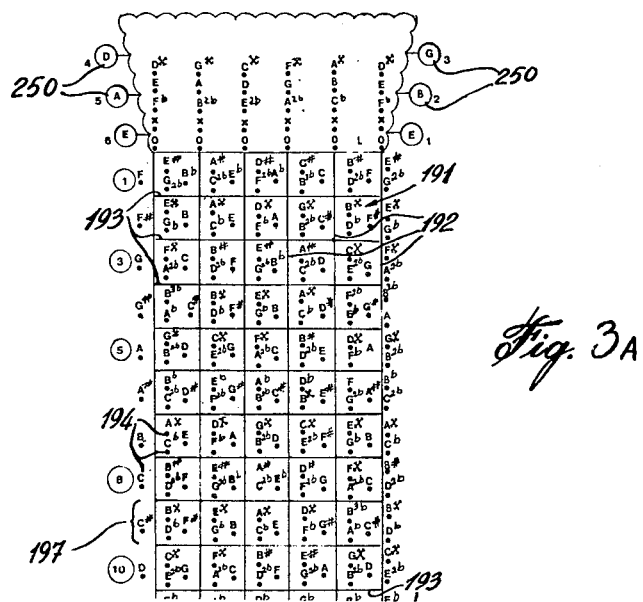

Referring now to FIG. 3, there is shown a further example of a console for use with the system of the present invention. Herein, the console 190 is to teach the position of the fingers for musical coded chords on a guitar keyboard.

The coded chord teaching device 190 for the guitar has been conceived to facilitate the learning of the coded chords, of the component notes of these coded chords and of the required fingering for each of the used positions for the visualized teaching of the coded chords. The device provides unlimited services to the operator who has no knowledge of the music or if the guitar in general as well as to the guitar professor or to the amateur or the professional guitarist.

A miniature display of a guitar keyboard table harmony 191 having six lines 192 represents the six strings of the guitar. Twelve transverse lines 193 extend transverse the six lines 191 to indicate the spaces named FRET 197.

The device 191 comprises 237 LED's indicators 194 or more, one for each musical note marked on the head and on the matrix handle. Each one of these notes is a component part to structure a coded chord and these illuminated notes indicate to the user the position of the left hand fingers on the strings. The six digital numbers 250, one for each guitar string, indicate with which finger to pinch on each one of the six guitar strings. Only the left hand thumb is not used to pinch the strings. The index finger is the first one, the long finger the second, the annular the third, and the little finger the fourth one.

Two groups of keys 251 and 252 entitled "ACCORD" grouping 32 movable switch keys 253, sixteen of which for the major chords and 16 for the minor chords. These keys activate the temporary memories as previously described with respect to FIG. 2.

Four switch keys 254 select four positions of each selected chord. The "R" key 255 permits the display of the positions of one selection of the selected chord. Numeric display 259 gives an indication of which fingers should be used to depress the strings indicated on the keyboard table 191.

The group of "TENSION" switches 256 comprises thirteen tensions that may be combined with any of the major tone keys 251', 252' or of the minor tone keys 251" and 252". These thirteen keys are equally marked with legends (representing the tensions).

These keys activate a temporary memory in the same way as the identical keys seen in the FIG. 1 as described above.

The key 257 marked "ATS" (Automatic Tension System) permits the display of thirteen tensions automatically.

The "C" (Reset key) 258 permits the cancellation of any selection or to cause any result on the display to disappear.

The operation of the console 190 will now be described briefly with respect to some examples. When the switch 195 is switched to the "ON" position, the notes on the display light up depending on the chord the user has chosen and indicates the component parts of the desired chord selected in the section 251 or 252.

Ex.:
Press on the "E" key 252'.
Press on the "R" key 255.
Result on the display E B E G# B E Depressing of one of these keys and the "R" (Result) key 255 on the display shows on the display with the aid of the light emitting diodes, the component parts of the selected major chord. The fingering to be used on each selected chord is indicated by numeric data figures 259 one for each selected string 192.

The four keys 254 under the title "POSITION" provide the selection of four different positions for each chord (From the cycle of perfect fourth or of perfect fifth of fourth with added tension or of fifth with added tension.

Examples of a perfect major chord are given below:
Ex.:
1—Press on the "C" key 252'.
2—Press on the "I" key 254.
3—Press on the "R" key 255.
Result on the display G C E G=C Chord
Result of the fingering to use 2nd, 3rd, 4th and 1st fingers
N.B. It is not necessary to press on the "C" key 258 as long as we are on the "C" tone key 252'.
4—Press on the "2" key 254,
Result on the display G E C G=C Chord 2nd position.
Fingering appearing on the console 1st, 4th, 3rd, 2nd fingers.
5—Press on the "1" key 254 first position of the "C" chord.
Result on the display E C G E C
Note that the fingering is shown from the first string to the sixth string, that is to say, from the highest tone to the lowest tone.

Result key "R" 255 lights up a light emitting diode on the display beneath each one of the notes, which compose the selected chord and indicates with numeric data figures 259, the fingering corresponding to the selected chord.

Ex.:
Press on the "D" key 252'.
Press on the "R" key 255
Result on the display F# D A D=D chord.
Result of the fingering shown on the numeric data figures from the note figuring on the 1st string
Second finger on the first string=F#
Third finger on the second string=D
First finger on the third string=A N.B. The "O" that lights on the display indicates that this string has to be pinched with the right hand and that the pressing with the left hand finger is excluded.

The depressing of one of the minor keys 251" or 252" and of the "R" key 255 shows on the display with the aid of the light emitting diodes the component parts of the chosen minor chords and the fingering of these chords is shown on the console with the aid of the numeric data figures (one for each string with fingering).

Ex.:
Press on the "Am" key 252".
Press on the "R" key 255.
Result shown on the display E C A E A
Result of the numeric figures data 1 3 2
Result from the guitar head display=0.

Pressing with any left hand finger is excluded on the first string; but the resonnance is nevertheless necessary. The illuminated "X" shown on the sixth string indicates that this string must be muffled.

The keys 256 grouped under the title "TENSION" may be combined with any of the regrouped keys 251 or 252 under the title "CHORD".

Ex.:
Press on the "C" key 252'.
Press on the "Maj. 7" key 256.
Press on the "R" key 255.
Result-
1st string E (Open String) Legend "0" illuminated
2nd string B (Open String) Legend "0" illuminated
3rd string G (Open string) Legend "0" illuminated
4th String E (Fingering—2nd finger)
5th String C (Fingering—3rd finger)
6th String X (This cord is not to resonate)

Note: One may combine (one at a time) the tensions with any chord or one's choice (one at a time).

The "ATS" (Automatic Tension System) key 257 becomes functional once it has previously executed the two following operations:
1—A selection amongst the keys 251 or 252 regrouped under the title "CHORD"
2—Pressed the "R" key 255.
Here is an example:
Press on the "G" key 252'.
Press on the "R" key 255.

The display at this time gives the result of these two operations and at the same time renders functional the "ATS" key.

Note that one must press thirteen times on the "ATS" key (once for each tension) which shall then be displayed in their ascending order from

| SUS. | 4 to 7 | Dim. |
|---|---|---|
| 1 | | 13 |

N.B. Only the first positions of each tension may be studied with the automatic tension system (ATS).

Pressing on the "C" key 258 cancels any selection.

N.B. It is suggested to press on the "C" key each time the contact is in the position "ON".

Figure 4:
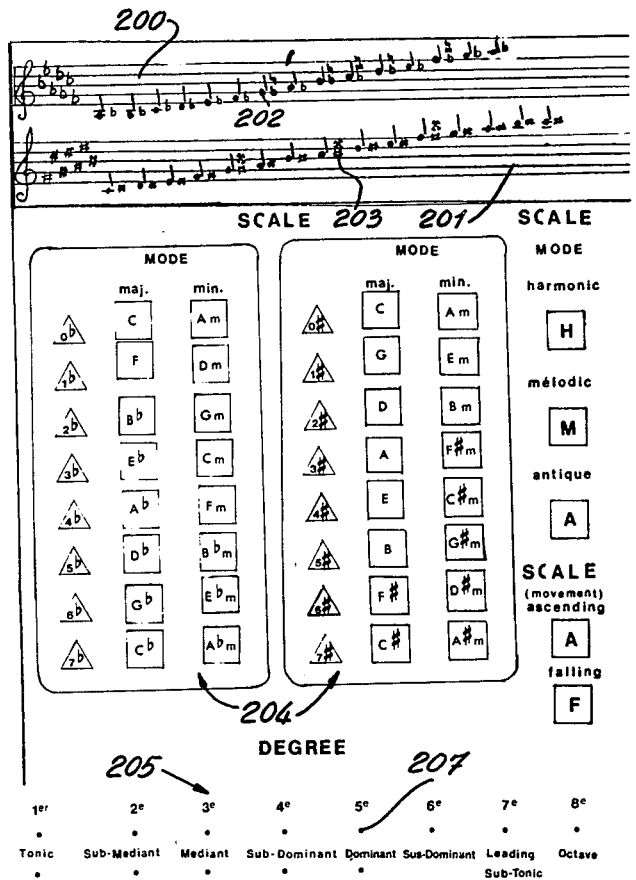
FIG. 4 is a plan view of another example of a console for music teaching utilizing the system of the present invention.

Referring now to FIG. 4, there is shown a further example of a console of a device constructed with the use of the system of the present invention. The main purpose of this console is to facilitate to the user the learning and the teaching of the diatonic, harmonic, melodic or antique scales—as well as the exact qualification of the intervals and of the degrees either ascending or descending. Moreover, it is another way to learn the composition of the major, minor and direct chords or of their derivates.

The scales and its components are the main root of the composition of the chords, it is therefore most important to learn them on one instrument of one's choice.

A user without any musical knowledge will be able, with the aid of this console, within a relatively short period of time, to possess a good musical knowledge and even within a somewhat longer period of time, be in a position to teach music to others.

As hereinshown, instead of a keyboard or a keyboard table as in FIGS. 1 and 3, there is provided two staffs 200 and 201 printed on the top part of the console. Each of the staffs has a scale of notes 202 and 203 printed thereon and in different musical keys, the top scale being in the key of "G" while the bottom scale is also in the key of "G", although it could be in any other key. The console is also provided with a first group of switch keys 204 similar to the first group of keys as shown in FIG. 1. Also on the console, there is provided a degree scale 205 and an interval scale 206, each position of which is associated with a light source (LED) 207 whereby when desired scales are depressed on the switches of the group 204, the particular notes on the staffs will illuminate and the proper light associated with the degree and intervals will also light to indicate to the user the composition of the desired scale. This type of instrument is particularly useful for scales and component part study. It can also be used in association with a musical instrument whereby the sound of the scale can be heard as well as the construction of its composite parts on a music staff.

Other examples of the present invention are foreseen. For example, the miniature keyboards could be incorporated into an organ or an electronic piano. The system can also be incorporated with any type of keyboard instrument, either manual or electronic, or in a portion of the keyboard of an instrument. The system can also be incorporated into a visual and audio system which could project on a screen the composite parts of a desired code and at the same time reproduce a sound of the desired scale.

It is within the ambit of the present invention to provide any other obvious modifications thereof, provided such modifications fall within the broad scope of the claims as appended hereto.

The embodiments of the invention in which an exclusive property or privilege is claimed are defined as follows:

1. An automatic visual music teaching device for displaying the exact structure of coded musical chords or scales snd permitting finger placement on a visual keyboard, said device comprising a first group of actuable switches for selecting a desired major and minor coded chord to be visually displayed, circuit means associated with said switches for providing binary signals indicative of said desired coded chord or scale, a decoding circuit for decoding said signals and providing a coded message signal, said coded message signal constituting an output address line signal which activates predetermined memory circuits of a memory system, said memory circuits feeding coded signals to matrix decoders to select proper x-y lines in said matrix, and display means having a plurality of light sources each associated with an intersecting x-y line of said matrix to visually indicate a composite part associated with one of said actuable switches representative of said desired coded chord, said display means further having a keyboard having visual coded markings thereon corresponding to the structure of all coded markings on particular ones of said actuable switch means representing the selected coded chord and modification thereof, each light source being associated with each said visual coded markings whereby to indicate the position of said composite parts of said coded chord in association with said keyboard; a second group of actuable switches representative of individual tensions of a selected chord of said first group of switches for altering, by augmenting or diminishing the said selected chord, the structure of said selected chord to display a modified selected chord; a third group of switches representative of the fundamental and three inversions of said selected chord to select the position of said selected chord on the keyboard and while maintaining the structure of said selected chord, said second and third group of switches also having circuit means to provide coded message signals to said memory circuit.

2. A device as claimed in claim 1 wherein there is further provided means for temporary storing said binary signals, release switch means for transferring said stored binary signals indicative of said desired coded chord to said decoding circuit.

3. A device as claimed in claim 2 wherein said actuable switch means are connected to encoder circuits to translate said desired coded chord to binary signals and a memory system to select in a matrix said composite parts of said desired coded chord in accordance with said coded message signal derived from said binary signals.

4. A device as claimed in claim 3 wherein said circuit means to translate said desired coded chord include temporary storage circuits having binary input signals associated with selected ones of said switch means, said binary input signals being transferred from said storage circuits to constitute said coded message signal.

5. A device as claimed in claim 2 wherein said first, second and third groups of switches are connected to respective ones of encoder circuits, said first group of switches being connected to two encoder circuits feeding coded message signals to temporary memory circuits, said memory circuits reproducing part of said address line signal representative of said coded message signals, said release switch means effecting transfer of said part of said address line signal.

6. A device as claimed in claim 5 wherein said second and third groups of switches are connected to associated temporary registers through associated ones of said encoder circuits, gate circuit means for producing control pulses for latching said associated ones of said temporary registers upon reception of predetermined binary signals to feed binary output signals to a code converter to feed said coded message signal to associated ones of said temporary storage circuits.

7. A device as claimed in claim 6 wherein said gate circuit means includes one or more one-shot circuits to produce said control pulses from predetermined input binary coded signals.

8. A device as claimed in claim 7 wherein there is further provided a manual reset switch to reset said temporary storage circuits, temporary registers, encoder circuits and gate circuit means to their initial conditions before said switches in said first, second and/or third groups of switches were depressed according to said desired coded chord or scale.

9. A device as claimed in claim 8 wherein said fundamental switch of said third group of switches permits a reset of said switches of said third groups of switches without affecting the binary coded message signals held by said temporary storage circuits associated with said first and second groups of switches.

10. A device as claimed in claim 9 wherein there is provided an automatic tension switch connected to a pulse producing circuit to feed a control pulse to said temporary memory associated with said second group of switches whereby said output address line signal will be fed to said matrix automatically at predetermined time intervals and at different ones of all said switches of said second group of switches, sequentially.

11. A device as claimed in claim 1 wherein said matrix decoders have outputs associated with respective x-y lines of said matrix, each of said outputs being connected to a respective driver circuit associated with light sources at each intersecting point of said x-y lines.

12. A device as claimed in claim 11 wherein an illegal code visual indicator is provided to indicate that said output address line signal is not contained in said memory.

13. A device as claimed in claim 12 wherein said illegal code visual indicator is a light emitting diode connected to a terminal at a driver circuit, another terminal of said driver circuit being connected to a terminal of one of said matrix decoders to sense a binary signal which will prevent said decoder from releasing its input signal and cause said driver circuit to permit said light emitting diode to light.

14. A device as claimed in claim 4 wherein said display means includes a plurality of light emitting diodes associated with a respective part of said composite parts of the desired coded chord.

15. A device as claimed in claim 14 wherein said display means comprises a miniature display of a guitar keyboard table having six string lines extending across a plurality of transverse lines, each said string lines having visual coded markings adjacent thereto above each transverse lines and corresponding to coded markings on particular ones of said actuable switch means representing the musical note names in major and minor and the sharp and flat tones, a light source associated with each said visual coded markings whereby to visually indicate the position of said composite parts of said coded chord in association with said row of lines.

16. A device as claimed in claim 14 wherein said display means comprises one or more music staffs, each staff having a scale of notes printed thereon in different musical keys, said actuable switch means being push-button switches, some of said push-button switches having coded markings thereon corresponding to associated ones of said notes printed on said one or more staffs; said switch means representing musical note names in major and minor, sharp and flat tones, all of which are associated with said scale of notes on each staff; a light source associated with component parts of said scale of notes on each staff whereby to visually indicate corresponding notes on said staff to said coded markings on depressed ones of said switches, and further light sources associated with degree/interval/-qualification scales indicative of the displayed notes associated with said staffs.

* * * * *